INVENTOR.
Edward C. Streeter, Jr.
BY
McGregor & Eisenman
ATTORNEYS

Aug. 18, 1970  E. C. STREETER, JR  3,524,281

FLOATING RIBBON ENVIRONMENTAL SCREEN

Filed Oct. 18, 1968  3 Sheets-Sheet 2

INVENTOR.
Edward C. Streeter, Jr.
BY
McGregor & Eisenman
ATTORNEYS

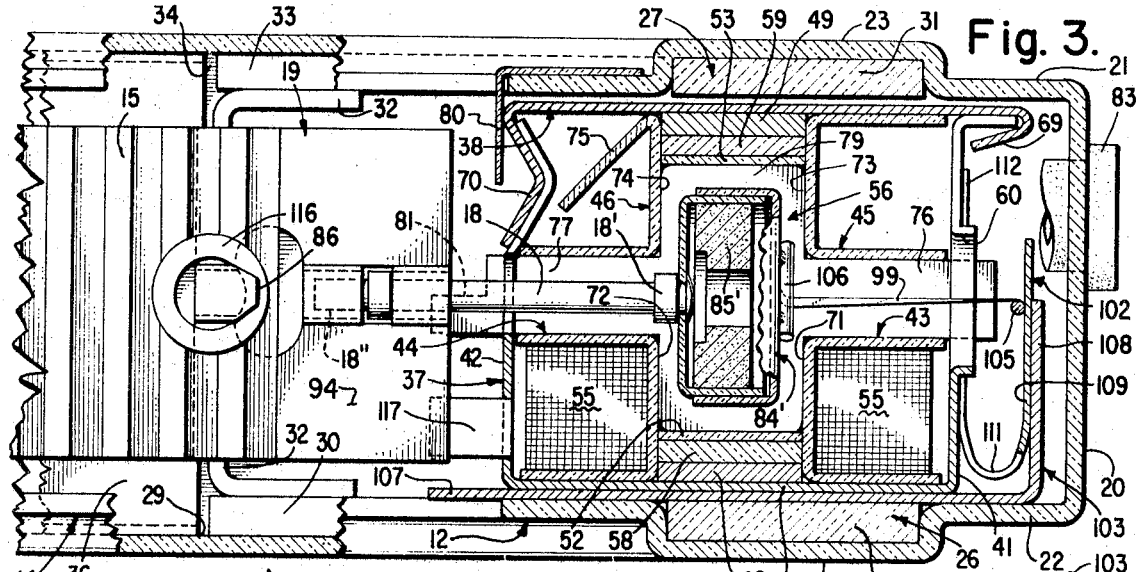
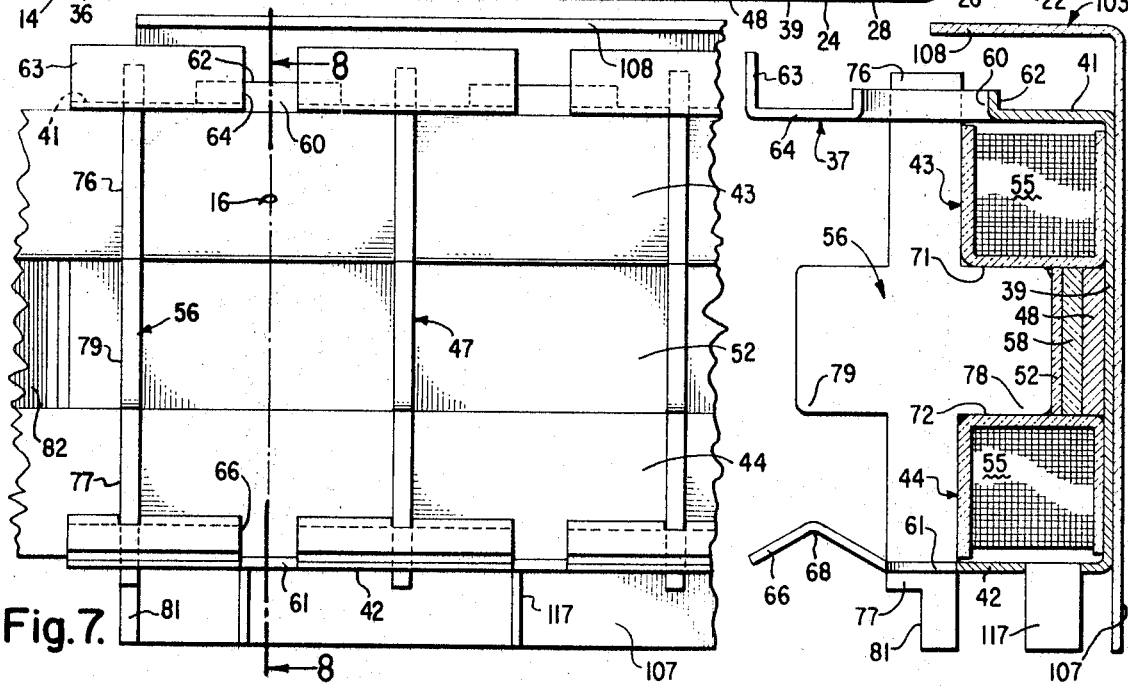
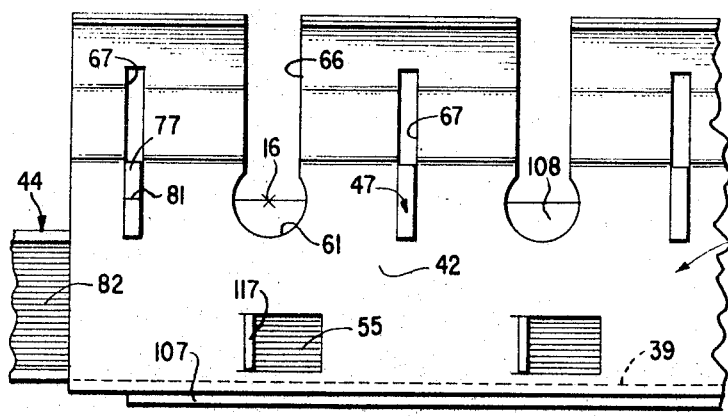
INVENTOR.
Edward C. Streeter, Jr.

United States Patent Office 3,524,281
Patented Aug. 18, 1970

3,524,281
FLOATING RIBBON ENVIRONMENTAL SCREEN
Edward C. Streeter, Jr., 39 Olin St.,
Ocean Grove, N.J. 07756
Filed Oct. 18, 1968, Ser. No. 768,784
Int. Cl. E05f *17/00;* E06b *7/08*
U.S. Cl. 49—74                                                9 Claims

ABSTRACT OF THE DISCLOSURE

An electromagnetically controlled screen having parallel ribbon-like louvers suitable for permanent hermetic sealing in the air space of a dual glazed insulating window and movable in unison to desired attitudes.

---

This invention concerns magnetically operated louvered screens suitable for permanent hemetic sealing in the air space between transparent plates of an insulating window.

The present invention is an improvement in an electrically controlled frictionless screen wherein parallel ribbon-like louvers are longitudinally tensioned by torsionally resilient end suspensions, and a permanent magnet rotor attached at one end of each louver exerts a torque to hold the louver at an angle thta is continuously adjustable in accordance with the strength of a remotely controlled magnetic field. The louver angle is primarily determined by the position at which the elastic torque exerted by the end suspensions balances the control torque produced by the interaction of the remotely controlled magnetic field and the permanent magnetic field of the rotor.

This type of screen has potentially outstanding characteristics for dual-glazed windows because it has a useful life equal to the life of the building in which it is installed. Vision through an open screen is extraordinarily unobstructed, the ratio of transmitted daylight to transmitted solar radiation is excellent, and the heat transmission coefficient of a closed screen is low. In combination with air conditioning and illumination control, the screen has a very favorable ultimate cost compared to other types of fenestration.

Care is taken in the prior screen to avoid magnetic coupling between adjacent permanent magnet rotors by providing mutual magnetic shielding therebetween. In the absence of such shielding, the magnetic coupling torque tends to align the magnetic axes of the rotors in the plane of the screen and thus acts to hold the louvers in a predetermined position. It was believed that excessive magnetic controlling torque would be required to overcome this magnetic centering action. However, the shielding also partially short-circuits the controlling magnetic field and thus increases the required operating power.

In accordance with the present invention, mutual magnetic shielding between the permanent magnet rotors is shown to be not only unnecessary but undersirable when a magnetically permeable body is provided parallel to the plane passing through the axes of the rotors at a suitable distance from this axial plane. The magnetism induced in the magnetically permeable body produces a locking torque on each permanent magnet rotor that tends to balance the coupling torque between adjacent permanent magnet rotors at all angles for parallel louvers. The ratio of the spacing between the axes of adjacent magnets to the spacing between the magnetically permeable body and the plane containing the rotational axes of the magnets is predetermined to give the screen desired torque characteristics.

A balanced mode of screen operation arises whenever the difference between th coupling torque and the locking torque is small compared to the elastic torque exerted by the louver end suspensions. In this operational mode, the louvers can be positioned by a very small magnetic control field. Unfortunately, the louvers are simultaneously rendered sensitive to unbalanced gravity torques and momentary disturbing torques. The provision of balancing and viscous damping arrangements adds to the manufacturing cost of the screen.

A bistable mode of screen operation arises when the locking torque is arranged to exceed the coupling torque, and the excess locking torque is greater than the elastic and gravity restoring torques acting on each louver. In this operational mode, the louvers have only two attitudes of stable equilibrium, for example, either inclined 17 degrees to the horizontal or closed. The louvers remain in one position of repose without consumption of power until a momentary control torque opposes and exceeds the locking torque. The transient control field unlocks the permanent magnet rotors and transfers the louvers to the other position of repose.

A magnetically centered mode of operation arises when the magnetic coupling torque exceeds the locking torque, and the excess coupling torque is substantially greater than the elastic restoring torque exerted by the louver end suspensions. The magnetic coupling torque renders the attitude of repose of the louvers insensitive to unbalanced gravity torques. The louvers are turned in response to a moderately strong control field, and differences in the elastic restoring torques have negligible effect on the louver attitudes. The control over the louvers is relatively stiff, and auxiliary damping is unnecessary.

The magnetically centered mode of operation is suitable for screens having louvers rotatable about either horizontal or vertical axes. The attitude of the louvers in the magnetically centered position of the rotors may be chosen as desired. For example, the louvers on horizontal axes may repose in a 45° shading position and be driven open or closed by control potentials of equal amplitude and opposite polarity. Rotation of at least 70 degrees in opposite directions is practical, say between +50° and —90°. Internal twist and internal torsional oscillation in the louvers can be avoided by employing permanent magnet rotors at both ends of each louver.

The power consumption of the screen is determined primarily by the excess coupling torque, which need be no greater than that required to obtain satisfactory louver operating characteristics. This excess coupling torque can be selected independently of the louver spacing and the magnetic moment of the rotors by adjusting the flux gap between the rotors and the magnetically permeable body that produces the locking torque.

The following simplified theoretical analysis may be helpful in understanding the invention. Each permanent magnet rotor can be considered to approximate an elliptic spheroid having uniform magnetization. Under this assumption, each rotor produces the same external effect as a dipole magnet of equal magnetic moment placed at its center and magnetized in the same direction.

Two identical dipole magnets in a common plane experience a mutual coupling torque $Q_K$ that may be expressed as $$Q_K = \frac{M^2}{r^3} (\sin \theta \cos \phi + 2 \sin \phi \cos \theta) \quad (1)$$

where $M$ = magnetic moment of each magnet,
$\theta$ = angle between the line joining the centers of the magnets and the magnetic axis of the first magnet,
$\phi$ = angle between the line joining the centers of the magnets and the magnetic axis of the second magnet, and
$r$ = distance between the centers of the magnets.

The magnetic axes of the permanent magnet rotors are fixed at identical angles relative to their respective louvers; consequently $\phi=\theta$ when the louvers are in their normally parallel state. Substituting $\theta$ for $\phi$ in Equation 1 we obtain $$Q_K = \frac{3M^2}{r^3} \sin\theta \cos\theta = \frac{3M^2}{2r^3} \sin 2\theta \quad (2)$$

It is observed that the coupling torque has a double sinusodial shape wherein the value is zero not only when the magnetic axes are aligned in the plane of the rotational axes but also when they are perpendicular to this plane.

Now consider the locking torque $Q_L$ resulting from magnetization induced in a magnetically permeable body having a face parallel to the plane passing through the axes of the rotors. The character of the locking torque can be ascertained from the following analogy. A dipole magnet of moment M having its magnetic axis at an angle $\beta$ from the perpendicular line measuring its distance $d$ from a very large plane face of a very large fixed mass of permeability $\mu$ is subject to a torque $$Q_L = \frac{(\mu-1)M^2}{8(\mu+1)d^3} \sin\beta \cos\beta \quad (3)$$

Since the permeability of the body is much greater than unity, and the line d is perpendicular to the line $r$, Equation 3 can be rewritten as $$Q_L = \frac{-M^2}{8d^3} \cos\theta \sin\theta = \frac{-M^2}{16d^3} \sin 2\theta \quad (4)$$

The locking torque $Q_L$ of Equation 4 has exactly the same shape as the coupling torque $Q_K$ of Equation 2, but the torques act in opposite directions.

Although the various simplifying assumptions render the proportionality constants inexact, it is evident that the distance $d$ of the magnetically permeable body from the axial plane of the rotors can be selected relative to the spacing $r$ between the centers of the rotors to predetermine the amplitude and sense of the residual double sinusoidial torque acting on each permanent magnet rotor.

The invention will now be described in detail with reference to a specific embodiment illustrated in the accompanying drawings wherein:

FIG. 3 is a horizontal cross section of the lower end of the right beam of the screen in FIG. 1 on the same scale as FIG. 2, looking downwards;

FIG. 7 is a front elevation of the lower end of a partly assembled right stator on an enlarged scale viewed from outdoors before insertion of rotors;

FIG. 8 is a cross section of the partly assembled stator taken along the dashed line 8—8 in FIG. 7; and FIG. 9 is a plan of the partly assembled stator looking outwardly parallel to the rotor axes.

THE MAIN COMPONENTS OF THE SCREEN

Figure 1:
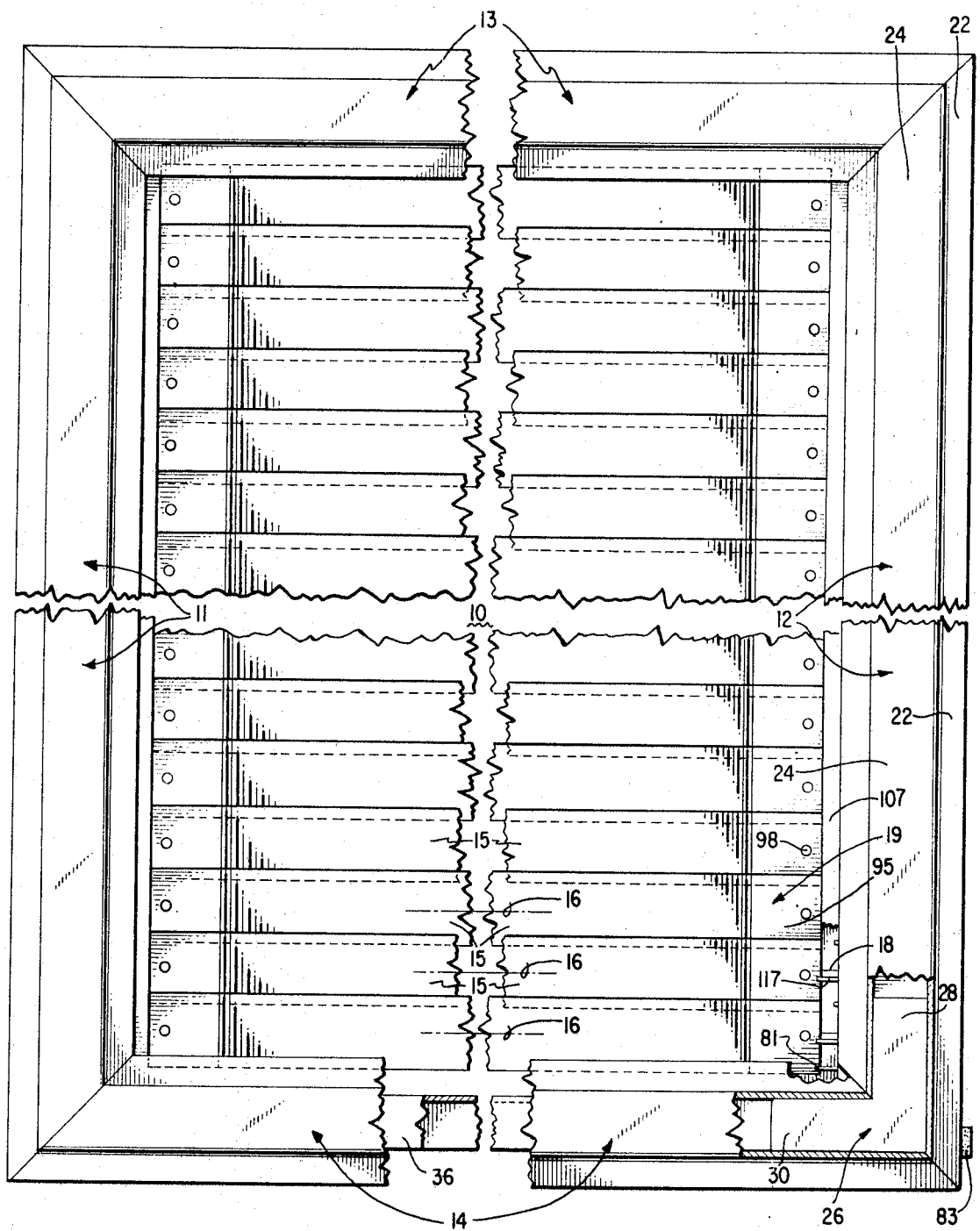
FIG. 1 is a front elevation of a screen viewed from indoors with its louvers closed for clarity of illustration.

The embodiment of the magnetically operated louvered screen chosen to illustrate the invention has a rectangular frame shown in FIG. 1 comprising vertical left and right beams 11 and 12, respectively, held apart at their top and bottom ends by horizontal struts 13 and 14, respectively. Longitudinally resilient louvers 15, shown for clarity in the partially overlapping closed position, extend between the beams 11 and 12 and are supported at their ends for rotation about parallel equally spaced horizontal axes 16 in response to the magnetically centered mode of operation. The rotational axes 16 lie in a common axial plane 17 indicated in FIG. 2.

An electrical torque motor assembly, comprising a compartmented stator assembly having a control coil, a permanent magnet rotor assembly in each stator compartment, and a frictionless torsional suspension for each rotor assembly, is contained inside each beam 11 and 12 with only rotor shafts 18 and louver connectors 19 projecting to hold the ends of the louvers 15 under longitudinal tension.

THE SCREEN FRAME

The beams 11, 12 and the struts 13, 14 have identical cross sections. Typically, the beam 12 (see FIG. 3) has a web 20 on the perimeter of the frame between a flange 21 facing outdoors and a flange 22 facing indoors. Flat-topped ridges 23 and 24 extend longitudinally along the flanges 21 and 22, respectively, to provide positive support for transparent plates (not shown) that separate an air space 10 within the frame from the ambient atmosphere.

The interiors of the beams 11, 12 and the struts 13, 14 are open to the air space 10. However, the ends of the beams and struts are beveled to form miter joints closing the exterior corners of the frame, which is held together by corner connectors. A typical connector shown in FIG. 3 joins the beam 12 and the strut 14 and comprises a pair of identical flat brace plates 26 and 27 interconnected by a stiffening member 32. The plate 26 has a first leg 28 that lies in the groove formed on the inside of the indoors flange 22 by the exterior ridge 24, and it has a second leg 30 extending at a right angle to the first leg 28 into a corresponding groove 29 on the inside of the indoors flange of the strut 14. The brace plate 27 has legs 31 and 33 that fit in a similar manner in the groove on the inside of the outdoors flange 21 and in a corresponding groove 34 inside the outdoors flange of the strut 14, respectively. The stiffening member 32 extends transversely across the interior of the strut 14 and is fastened to the ends of legs 30 and 33. The legs 28 and 31 are permanently attached to the flanges 22 and 21, respectively, of the beam 12. However, the legs 30 and 33 merely slide into the open end of the strut 14 when the frame is assembled. No additional fastening to the strut 14 is required because the tension of the louvers 15 prevents separation of the beams and struts.

A strut interior cover 36 in the form of a U-shaped channel extends substantially the length of the strut 14 and is retained by the grooves 29 and 34. There is ample space between the cover 36 and the web of the strut 14 for desiccant (not shown).

The beams and struts may conveniently be roll formed from strip aluminum. However, it is preferable to make the beams 11 and 12 of soft steel when the balanced mode of screen operation is employed in order to provide magnetic shielding for the torque motor assemblies within.

It is only necessary to describe the contents of the right beam 12, since the torque motor assembly in the left beam 11 is identical.

THE STATOR ASSEMBLY

The stator assembly in the beam 12 comprises a magnetically permeable stator housing consisting of a housing channel 37 and a housing cover 38 that together have an approximately rectangular hollow cross section and a length substantially equal to the vertical spacing of the struts 13 and 14. The housing channel 37 has a web 39 parallel to and spaced from the axial plane 17. Flanges 41 and 42 project from the web 39 perpendicularly to the axial plane 17 and are engaged by the housing cover 38, which is parallel to the web 39 and is equally spaced from the opposite side of the axial plane 17.

Coil supporting channels 43 and 44 occupy the inside corners of the housing channel 37 adjacent the web 39 and the flanges 41 and 42, respectively. Stator filler channels 45 and 46 occupy the other two corners of the stator housing adjacent the cover 38 and the channel flanges 41 and 42, respectively. The channels 43–46 are held apart by stator partitions 47 perpendicular to the axial plane 17 and equidistant adjacent rotational axes 16. The channels 43–46 and the stator partitions 47 are made of non-magnetic material, e.g. aluminum.

A magnetically permeable pole strip 48 lies against the web 39 between the coil supporting channels 43 and 44. A corresponding pole strip 49 lies against the cover 38 between the stator filler channels 45 and 46. Second magnetically permeable pole strips 50 and 51 are positioned against the inside faces of the pole strips 48 and 49, respectively. The remaining space between the pole strips 50 and 51 and the edges of the partitions 47 is filled by non-magnetic pole spacer strips 52 and 53, respectively.

Figure 2:
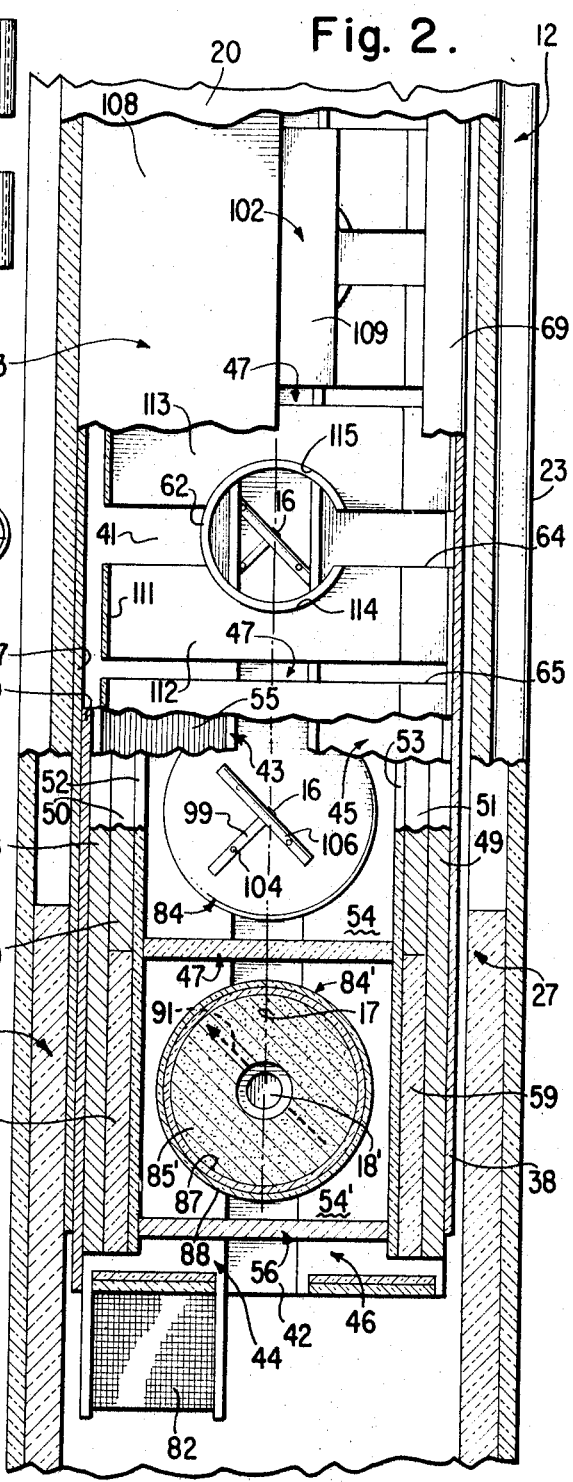
FIG. 2 is a side elevation of the lower end of the right beam of the screen in FIG. 1 on an enlarged scale, looking toward the interior of the screen, with portions broken away to reveal internal construction.

As shown in FIG. 2, each pair of adjacent stator partitions 47 and the pole spacer strips 52 and 53 form the boundaries of a square stator compartment 54 having one of the rotational axes 16 at its center. A control coil 55 supported in the channels 43 and 44 is thus positioned to produce a laminar magnetic control field across the stator compartments 54 perpendicularly to the axial plane 17.

The asymmetrical position of the terminal compartment 54' at each end of the stator causes less coupling torque and more controlling torque to act on the rotor therein than act on the rotors in intermediate stator compartments 54, as will be explained. Torque compensation is accomplished by the provision of a terminal partition 56 of magnetically permeable material and non-magnetic pole spacer members 58 and 59 that replace the magnetically permeable pole strips 50 and 51, respectively, opposite the terminal compartment 54'.

The housing channel 37 is shown most clearly in FIGS. 7–9 illustrating a partly assembled stator prior to the insertion of rotor assemblies. The channel flanges 41 and 42 have circular holes 60 and 61, respectively, along their longitudinal centerlines concentric with each rotational axis 16. Each hole 60 has a slight upstanding rim 62 on the exterior of the flange 41. An upstanding lip 63 is provided along the free edge of the flange 41 parallel to the axial plane 17. The lip 63 and each rim 62 are interrupted by a slot 64 in the flange 41 that provides radial access to each hole 60 from outside the channel 37. Midway between each pair of adjacent holes 60, a narrow slot 65 (see FIG. 2) extends perpendicularly to the axial plane 17 from the web side of said plane to but not through the lip 63.

The channel flange 42 has slots 66, corresponding to the slots 64 on the flange 41, that extend from its free edge toward the web 39 and terminate in the holes 61. A narrow slot 67, corresponding to the slots 65 on the flange 41, lies midway between each pair of adjacent holes 61. The slot 67 extends from the web side of the axial plane 17 perpendicularly outwards leaving only sufficient material adjacent the free edge of the flange 42 to strengthen the same. A groove 68 runs along the length of the flange 42 adjacent the free edge for holding the housing cover 38.

The housing cover 38 (see FIG. 3) is a generally flat strip with a hook-shaped lip 69 on one edge for engaging the lip 63 on the channel flange 41. A grooved flange 70 on the other edge of the cover 38 is shaped to clip into the groove 68 on the channel flange 42.

The coil supporting channels 43, 44 and the stator filler channels 45, 46 have webs 71, 72 and 73, 74, respectively, that bound the stator compartments 54 in the direction of the axis 16. The flanges of the channels 43–46 are parallel to the axial plane 17 with the exception of a flange 75 of the stator filler channel 46, which is bent inwardly to permit clipping the housing cover 38 in place.

The terminal partition 56 has the general shape of a flat cross and is symmetrical with respect to the axial plane 17. Partition arms 76 and 77 extend in opposite axial directions between the adjacent flanges of the channels 43, 45 and 44, 46, respectively, and protrude slightly through the narrow slots 65 and 67, respectively, in the flanges 41 and 42, respectively, of the housing channel 37. Shorter, broader partition arms 78 and 79 extend perpendicularly to the axial plane 17 in opposite directions between the webs 71, 72 and 73, 74, respectively, of the channels 43, 44 and 45, 46, respectively. The ends of the arms 78 and 79 abut the pole spacer strips 52 and 53, respectively. A louver closing limit stop 81 projects from the end of the partition arm 77, and the terminal partition 56 is asymmetrical to this extent.

Each stator partition 47 is identical in shape to the terminal partition 56 with the omission of the limit stop 81. However, the partitions 47 are made of non-magnetic material in contrast to the magnetically permeable material of the terminal partition 56.

The control coil 55 is wound with multiple turns of an insulated electrical conductor, which is preferably aluminum wire or foil to reduce weight and to minimize movement relative to the supporting channels 43 and 44 in response to temperature changes. The parallel portions of the coil 55 are joined by return bends beyond the terminal partitions 56 at either end of the stator housing. A return bend 82 is shown in cross section in FIG. 2. The magnetically permeable material of the terminal partition 56 acts to short circuit the flux contributed by the adjacent return bend. Accordingly, the control field through the terminal stator compartment 54' is not substantially greater than the control field passing through the intermediate compartments 54. The terminals (not shown) of the coil 55 and the corresponding coil in the beam 11 are connected to a recessed hermetically sealed male receptacle 83 mounted on the web 20 of the beam 12.

The stator housing 37, 38 is held in the beam 12 by a thin stator retaining strip 80 (see FIG. 3) that is attached to the outer face of the outdoors flange 21. The retaining strip 80 is bent around the sharp edge of the flange 21 after the housing 37, 38 has been inserted in the beam 12 and brought to bear on the housing cover 38. The tension on each louver 15 is so slight, e.g. 3 ounces, that the load on the retaining strip causes no noticeable deflection thereof.

THE PERMANENT MAGNET ROTOR ASSEMBLIES

Each permanent magnet rotor assembly comprises a non-magnetic capsule 84 that contains a permanent magnet rotor 85 and is supported by a torsional suspension for rotation about the central axis 16 within a respective stator compartment 54. The capsule 84 is attached by the rotor shaft 18 to the louver connector 19, which has a hook 86 for detachably engaging the associated louver 15. The rotor assembly in the terminal compartment 54' has a capsule 84' containing a permanent magnet rotor 85' and is identical to the other rotor assemblies.

Figure 6:
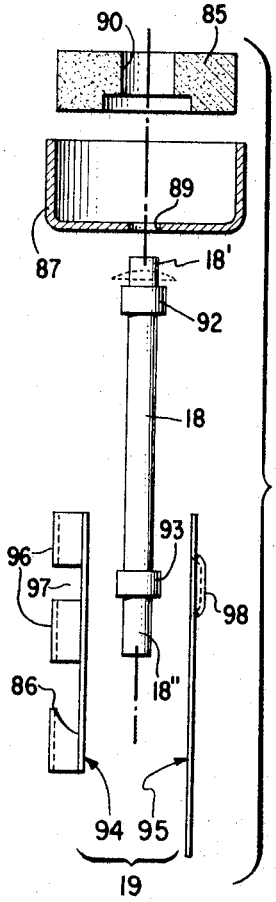
FIG. 6 is an exploded elevational view, partly in section, of a rotor subassembly.

The capsule 84 comprises a cup 87 and a tight fitting cover 88, each in the shape of a hollow cylinder closed at one end by a circular base. The cylindrical wall of the cup 87 has a height slightly greater than the axial thickness of the permanent magnet rotor 85 and an inside diameter that makes a snug fit with the diameter of the rotor. The base of the cup 87 has a central hole 89 (see FIG. 6) for attaching the shaft 18. The open ends of the capsule cover 88 and the cup 87 face each other, and the cylindrical wall of the cover almost completely overlaps the wall of the cup in tight contact therewith. The cup 87 and the cover 88 are conveniently made of soft brass.

The permanent magnet rotor 85 has a cylindrical disk shape with the axis of symmetry coaxial with the rotational axis 16. The rotor 85 is formed with a central depression or axial hole 90 and can be inexpensively made of sintered Alnico II material. The rotor 85 is magnetized across its diameter, and the magnetic axis is indicated in FIG. 2 by a dashed line 91 at an angle of 45 degrees to the axial plane 17 because the louver 15 is held in the open position (see FIG. 3). Normally, the louvers repose in a shading position with the magnetic axes 91 parallel to the axial plane 17 in the absence of a control field produced by the coil 55.

The rotor shaft 18 (see FIG. 6) has a round cross section and is formed with an integral cylindrical collar 92 abutting the base of the capsule cup 87. A stud portion 18' of the shaft 18 projects from the collar 92 through the hole 89 in the cup 87 and is flattened to secure the shaft 18 to the capsule 84. The shaft 18 extends in the opposite direction along the rotational axis 16 through the hole 61 into the air space 10 where a second integral collar 93 near the other end 18" of the shaft holds the louver connector 19.

The louver connector 19 (see FIG. 6) comprises a shell 94 and a cover 95 of thin, light-weight sheet material, e.g. aluminum, having generally flat rectangular inner faces secured together in a plane tangent to the rotor shaft 18. The louver connector shell 94 has a quasi-tubular ridge 96 formed along its longitudinal centerline that provides a groove on its inner face closely surrounding the terminal portion of the shaft 18. A transverse slot 97 interrupts the ridge 96 to receive the shaft collar 93. The ridge 96 is again interrupted beyond the shaft end 18" and undercut to form the hook 86. The hook 86 is easily made by suitably perforating the shell blank prior to forming the ridge 96.

The louver connector cover 95 is a rectangular sheet that is flat with the exception of a dimple 98 opposite the slot 97 in the shell 94 to accommodate the bulge of the shaft collar 93. The cover 95 has the same width as the shell 94, but it is somewhat longer in order to provide light shielding for the end of the louver 15.

Sufficient axial clearance is provided between the louver connectors 19 and the flange 42 of the housing channel 37 to permit adjustment of the assembled screen for perfect parallelism between the louvers 15 in their position of repose. This is accomplished by momentarily holding the shaft 18 fixed and overcoming the friction between the louver connector 19 and the shaft.

THE TORSIONAL SUSPENSIONS

Each torsional suspension comprises a metal torsion ribbon 99 attached by a weld 101 (see FIG. 4) near one of its ends to a shock absorbing flat spring 102 that is held under compression by a spring prestressing member 103 and attached by a weld 104 near its opposite end to the capsule cover 88 of a rotor assembly.

Identical tangent pins 105 and 106 of round cross section are welded to the spring 102 and to the capsule cover 88, respectively, tangent to the rotational axis 16. The torsion ribbon 99 passes between the pin 105 and the flat surface of the spring 102, makes a quarter turn around the pin 105, and extends along the axis 16 to the pin 106, around which it makes a quarter turn, passing between the pin 106 and the flat surface of the capsule cover 88. The pins 105 and 106 clamp the ribbon 99 and accurately determine the points of tangency between which torsion can occur. The pins 105 and 106 also define the terminal planes in which the torsion ribbon 99 lies at its effective ends, exert some snubbing action on the ribbon, and protect the welds 101 and 104 from all stresses other than shear stress.

It is to be observed that the magnetic axis 91 (see FIG. 2) of the permanent magnet rotor 85 is parallel to the tangent pin 106. When the pins 105 and 106 are parallel to each other, the magnetic axis 91 is parallel to the axial plane 17. Accordingly, the elastic restoring torque of the torsion ribbon 99 and the magnetic coupling torque on the rotor 85 are zero at the same angular position of the rotor shaft 18.

The elastic restoring torque is highly sensitive to variation in the thickness of the thin torsion ribbon 99. However, in the magnetically centered mode of operation, the portion of the magnetic coupling torque that is not neutralized by the locking torque is the major influence in restoring the louvers to their position of repose. Accordingly, the dimensional tolerance of the torsion ribbon 99 can be relaxed and its manufacturing cost thus greatly reduced without noticeably impairing the uniformity of the louver attitudes.

The spring prestressing member 103 extends the length of the stator housing channel 37 and has a base 107 that is fastened flat against the outside surface of the channel web 39. The base 107 projects above the channel flange 41 and carries a cantilever leg 108 that extends parallel to the flange 41 and terminates substantially at the axial plane 17. The other edge of the base 107 projects beyond the channel flange 42 to form a light shield between the louver connectors 19 and the beam 11 or 12. The spring prestressing member 103 is preferably made of soft sheet steel to facilitate welding to the stator housing channel 37 and to minimize deflection of the cantilever leg 108 by the springs 102, which are restrained in a manner described below.

Figure 4:
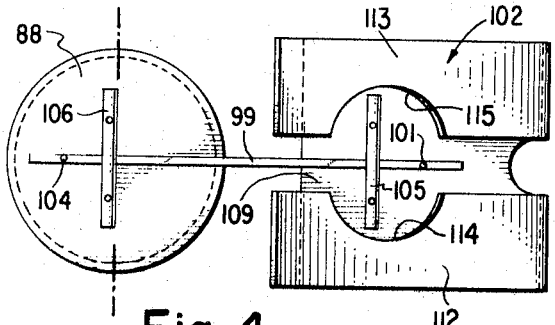
FIG. 4 is a plan of a torsional suspension subassembly in its welding position.
Figure 5:
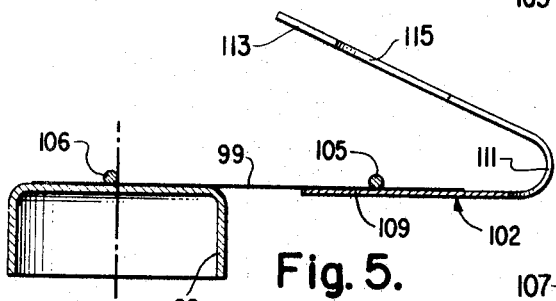
FIG. 5 is an elevational section of the subassembly of FIG. 4 through its longitudinal centerline.

The shock absorbing spring 102 is made of a bifurcated thin metal strip of rectangular outline and has a cantilever arm 109 joined by a U-shaped bend 111 to a pair of legs 112 and 113. The width between the parallel outer edges of the legs 112 and 113 is slightly less than the space between adjacent stator partitions 47. Juxtaposed circular arcs 114 and 115 are formed on the inner edges of the legs 112 and 113 respectively, having a diameter equal to the outer diameter of the rim 62 on the flange 41. The bifurcation of the spring 102 extends around bend 111 to facilitate attachment of the tangent pin 105 and the torsion ribbon 99 to the inside surface of the arm 109, as shown in FIGS. 4 and 5. The spring 102 nests in the space between the flange 41 and the spring prestressing member 103 with the legs 112 and 113 resting on the flange 41, the arm 109 pressing against the inside surface of the cantilever leg 108, and the bend 111 adjacent the base 107. The arcs 114 and 115 resiliently grip the rim 62 to center the spring 102 on the axis 16, and the outer edges of the legs 112 and 113 contact the protruding portions of the arms on the stator partitions 47 to prevent rotational movement of the spring about the axis 16. The spring arm 109 projects beyond the edge of the cantilever leg 108 to provide a convenient handling surface while compressing and inserting the spring 102.

The tensional force on the torsion ribbon 99 under normal conditions of screen operation is less than the compressional force on the restrained spring 102. Accordingly, the spring arm 109 remains in contact with the prestressing cantilever leg 108, and the spring 102 acts as if it were non-resilient. However, the spring still serves to protect the torsion ribbon in the presence of severe mechanical shock such as may occur during screen shipment or installation. At these times when the tension on the torsion ribbon 99 substantially exceeds the normal tension, the spring arm 109 is pulled away from the cantilever leg 108, and the capsule 84 is displaced from its central position within the stator compartment 54. The movement of the capsule 84 is limited axially by the webs 72 and 74 and radially by either a spacer strip 52 or 53 or a partition 47 or 56 before the stress of the torsion ribbon becomes excessive.

The axial position of each capsule 84 is thus normally independent of the inherent spring rate of the shock absorbing spring 102; consequently the axial clearances between the capsule 84 and the coil supporting channels 43, 44 and the stator filler channels 45, 46 can be minimized. The springs 102 at the opposite ends of each louver 15 do not need to be carefully matched, and the springs can therefore be inexpensively manufactured. Beryllium copper is a suitable material for both the torsion ribbon 99 and the spring 102. The tangent pins 105 and 106 are made of brass.

THE LOUVERS

Each louver 15 is made of a corrugated ribbon of metallic foil slightly wider than the spacing between adjacent rotational axes 16 in order that adjacent louvers overlap in the closed position. Eyelets 116 are provided at each end of the louver centered on its longitudinal axis for engagement with the hooks 86 of the louver connectors 19.

The axes of the louver corrugations extend parallel to the width of the louver to render the same longitudinally resilient. The corrugations, say 20 to the inch, stiffen the louver transversely, accommodate thermal expansion and contraction of the louver relative to the struts 13 and 14, and compensate for unavoidable variation in the spacing of the beams 11 and 12. The louver advantageously uses the thinnest practical foil, e.g. .001 inch thick, in order to maximize its resilience and minimize its sag. Spring-tempered high strength aluminum alloy is a particularly suitable material because of its light weight and low modulus of elasticity. The thinness of the foil permits the necessary longitudinal resilience to be obtained with such fine corrugations that the louver looks essentially flat.

The eyelets 116 are conveniently inserted at suitably spaced intervals in a continuous length of corrugated foil that is held at the design tension. Each louver 15 is then cut off from the continuous length of foil just beyond each eyelet 116, and the short interconnecting piece of foil is discarded.

THE LOUVER ANGLE LIMITING STOPS

The louver closing limit stop 81 projects from the end of the arm 77 of the terminal partition 56 sufficiently to contact the louver connector cover 95 associated with the louver adjacent the bottom strut 14 when this louver is substantially vertical. The overlapping of the intermediate louvers limits the closing movement thereof. Excessive closing rotation of the louver adjacent the top strut 13 is prevented by a closing limit stop similar to stop 81 but reversed to contact the louver connector shell 94 associated with this top louver.

Louver opening limit stops are provided for each end of every louver 15 in the form of rectangular tabs 117 lanced from the stator housing flange 42 adjacent the web 39. The plane of each tab 117 is horizontal, and its upper face is offset below each rotational axis 16 a distance equal to the radius of the rotor shaft 18 and the thickness of the louver connector cover 95. The cover 95 contacts the upper face of the tab 117 when the louver 15 has turned to its horizontally open position (see FIG. 3).

The louver opening limit stops are not essential, but they permit the louvers to be perfectly aligned at both ends in the open position in addition to their alignment in the shading and closed positions. Three discrete positions are usually sufficient for horizontally rotatable louvers, and this mode of operation permits dimensional and magnetic tolerances to be very liberal without destroying the uniform appearance of the screen. Accordingly, manufacturing cost is substantially less than when the louvers are required to be infinitely adjustable.

DISCUSSION OF MAGNETIC CHARACTERISTICS

It is clear that each permanent magnet rotor 85 is magnetically coupled to the rotor adjacent each end of its stator compartment 54 because the stator partitions 47 are made of nonmagnetic material. However, the magnetic coupling torque on the rotor 85′ in the terminal stator compartment 54′ has half the amplitude of the coupling torque on the intermediate rotors because the terminal rotor 85′ is coupled to only a single adjacent rotor. It has been mentioned that the magnetically permeable partition 56 serves to short circuit the flux contributed by the return bend 82 of the control coil 55. The terminal partition 56 also acts as a fictitious rotor exerting an attractive torque on the terminal rotor 85′ similar to a magnetic coupling torque but of less amplitude.

The pole strips 50 and 51 each serve as a magnetically permeable body spaced from the axial plane 17 and exerting locking torques on the permanent magnet rotors 85. The pole strips 48 and 49 serve this same purpose in the stator terminal compartment 54′.

The locking torque on the terminal rotor 85′ is less than the locking torque on the intermediate rotors 85 because the magnetically permeable bodies, i.e. the pole strips 48 and 49, are spaced further from the axial plane 17 than the pole strips 50 and 51. This lesser locking torque tends to compensate for the reduction in magnetic coupling torque, and the residual torque on the rotor 85′ is substantially the same as the residual torque on the other rotors 85.

The bistable mode of operation arises when the permanent magnet rotor 85 is omitted from every odd capsule 84 in one beam and from every even capsule 84 in the other beam. Under this condition, adjacent louvers are driven from opposite beams, and adjacent rotors 85 are separated by twice the louver axial spacing. The magnetic coupling torque is much less than the locking torque. The pole strips 48–51 are eliminated to reduce the locking torque and necessary switching power. Accordingly, the web 39 and the cover 38 of the stator housing become the magnetically permeable bodies that exert the locking torques in the bistable mode.

The minimum flux gap between the permanent magnet rotor 85 and the pole strip 50 or 51 must be correlated with the maximum lateral displacement of the capsule 84 in order to prevent the attractive force between the magnet and one of the magnetically permeable bodies from exceeding the centering force exerted by the torsional suspension. The centering force is proportional to the product of the tensional force on the torsion ribbon 99 and the linear displacement of the capsule 84 and inversely proportional to the effective length of the torsion ribbon. The maximum attractive force is a direct function of the magnetic moment of the rotor 85 and an inverse function of the flux gap. The attractive force increases very rapidly as the flux gap approaches zero. The pole spacer strips 52 and 53 permit the maximum lateral displacement of the capsule 84 to be predetermined independently of the flux gap. With certain values of the design parameters, the flux gap inherent in the cylindrical walls of the capsule cup 87 and the capsule cover 88 is sufficient, and the spacer strips 52 and 53 can be omitted.

I claim:

1. A magnetically adjustable screen comprising a plurality of louvers turnable about parallel transversely spaced longitudinal axes, a separate motor rotor attached to an end of each louver and permanently magnetized at an angle to said axes, adjacent rotors being exposed to reciprocal magnetic coupling torques, a magnetically permeable body spaced from the plane containing the rotational axes of said rotors and exerting locking torques on said rotors, and means to control the flux field of the rotors to adjust the angle of the louvers.

2. A magnetically adjustable screen according to claim 1 wherein said means to control the flux field of the rotors comprises means for establishing a magnetic control field which interacts with the field of said rotors.

3. A magnetically adjustable screen according to claim 1 wherein said means to control the flux field of the rotors comprises a control coil common to said rotors.

4. A magnetically adjustable screen according to claim 1 wherein the ratio of the spacing between the axes of adjacent motor rotors to the spacing between the magnetically permeable body and the axial plane of said rotors is predetermined to produce a desired ratio of the coupling torque to the locking torque.

5. A magnetically adjustable screen comprising a plurality of louvers turnable about parallel transversed spaced coplanar longitudinal axes, rotors coaxially coupled to at least one end of each louver and permanently magnetized substantially perpendicularly to said axes, a magnetically permeable stator having a surface extending parallel to the plane containing the axes of said rotors, said stator being open between said rotors to allow mutual magnetic coupling therebetween and to exert locking torques on said rotors in the direction of said stator surface, and means for establishing a control field interacting with said rotors, within said stator for adjusting the angle of said louvers.

6. A magnetically adjustable screen comprising a plurality of louvers turnable about parallel transversely spaced coplanar longitudinal axes, a separate rotor attached to each louver and permanently magnetized substantially perpendicularly to the louver axis of rotation, adjacent rotors being exposed to reciprocal magnetic coupling torques tending to align the magnetic axes of said rotors in the plane containing said rotational axes, a magnetically permeable body spaced from said axial plane and exerting locking torques on said rotors in opposition to the coupling torques, and means adjacent said rotors for producing a magnetic field substantially perpendicular to said rotational axes to exert a control torque on said rotors to turn said louvers.

7. A magnetically adjustable screen according to claim 6, further comprising torsionally resilient end suspensions for supporting the louvers under axial tension, said suspension exerting less restoring torque on each rotor than the residual torque corresponding to the difference between the magnetic coupling torque and the locking torque acting on said rotor.

8. A magnetically adjustable screen comprising a plurality of louvers turnable about parallel transversely spaced longitudinal axes from a predetermined angle of repose, a separate rotor attached to each louver and permanently magnetized substantially perpendicularly to its axis, adjacent rotors being exposed to reciprocal magnetic coupling torques tending to maintain said louvers at the predetermined angle of repose, a magnetically permeable body spaced from the plane containing the rotational axes of said rotors and exerting locking torques on said rotors in opposition to the coupling torques, and a common control coil adjacent said rotors for producing an adjustable magnetic field substantially perpendicular to said rotational axes for exerting a torque on said rotors to hold said louvers at an angle adjustable according to the strength of said adjustable magnetic field.

9. A magnetically adjustable screen according to claim 8, further comprising torsionally resilient end suspensions for supporting the louvers under axial tension, the elastic restoring torques exerted by said suspensions being substantially less than the magnetic coupling torques.

References Cited

UNITED STATES PATENTS

| | | | |
|---|---|---|---|
| 3,211,264 | 10/1965 | Streeter | 49—371 X |
| 3,342,244 | 9/1967 | Streeter | 160—107 |

DAVID WILLIAMOWSKY, Primary Examiner

P. C. KANNAN, Assistant Examiner

U.S. Cl. X.R.

310—36, 114